United States Patent [19]

Yuasa et al.

[11] Patent Number: 4,904,065
[45] Date of Patent: Feb. 27, 1990

[54] LIQUID CRYSTAL OPTICAL ELEMENT AND METHOD OF PRODUCING THE SAME USING FERROELECTRIC POLYMER LIQUID CRYSTAL

[75] Inventors: Kimihiro Yuasa; Kenji Hashimoto; Shunji Uchida; Kazuharu Morita; Satoshi Hachiya, all of Chiba, Japan

[73] Assignee: Idemitsu Kosan Co., Ltd., Tokyo, Japan

[21] Appl. No.: 209,937

[22] Filed: Jun. 22, 1988

[30] Foreign Application Priority Data

Jun. 22, 1987 [JP] Japan .................................. 62-153538
Jun. 30, 1987 [JP] Japan .................................. 62-161029

[51] Int. Cl.$^4$ .............................................. G02F 1/13
[52] U.S. Cl. ................... 350/350 S; 427/171; 427/401; 427/445
[58] Field of Search ............. 350/350 S; 427/171, 427/401, 445, 106, 108; 254/199

[56] References Cited

FOREIGN PATENT DOCUMENTS 014152 5/1985 European Pat. Off. .

OTHER PUBLICATIONS

Shibaev, V. P. et al., "Synthesis and Structure of Liquid-Crystalline Side Chain Polymers", *Pure and Appl. Chem.*, vol. 57, No. 11, pp. 1589–1602 (1985).

*Primary Examiner*—Andrew J. James
*Assistant Examiner*—Richard F. Gallivan
*Attorney, Agent, or Firm*—Antonelli, Terry & Wands

[57] ABSTRACT

A liquid crystal optical element comprising: (a) an oriented ferroelectric liquid-crystalline polymer layer which exhibits chiral smectic C phase, and (b) two electrically conducting layers which support the oriented ferroelectric liquid-crystalline polymer layer between them, where at least one of the two electrically conducting layers is transparent. The liquid crystal optical element can be easily made into one having a large area and can be used as a flexible display screen. Further, it has excellent electric field response property and high contrast. Furthermore, the production of the liquid crystal optical element and the control of its thickness can be easily conducted.

5 Claims, 1 Drawing Sheet

LIQUID CRYSTAL OPTICAL ELEMENT AND METHOD OF PRODUCING THE SAME USING FERROELECTRIC POLYMER LIQUID CRYSTAL

BACKGROUND OF THE INVENTION (a) Field of the Invention

The present invention relates to a liquid crystal optical element and a method of producing the same, which can be advantageously used for producing liquid crystal display elements having large acreage, etc.

(b) Description of the Related Art

Heretofore, for the purpose of large scale display, some methods of producing large display screens by accumulating small blocks of CRT, fluorescent character display tubes, etc. have been developed. However, these methods require complicated operation systems causing the necessity for enormous devices. Further, these methods where small blocks are arranged cannot be free from connecting portions and, therefore, have some defects such as unsuitableness for high resolution display or continuous pattern display.

In order to dissolve these defects and provide liquid crystal optical elements which can enable large scale display, there have been recently proposed some liquid crystal optical elements produced using liquid-crystalline polymers (See, e.g., Japanese patent applications Laid-Open No. 10,930/1984 and No. 137,133/1986).

Nevertheless, the techniques proposed in the Japanese patent application Laid-Open No. 10,930/1984 have fundamental problems such as insufficient property of response to electric field, poor contrast, etc. On the other hand, the liquid crystal optical elements employing oriented liquid-crystalline polymer disclosed in the Japanese patent application Laid-Open No. 137,133/1986 have a response property and a contrast each improved in some degree, but have a deficiency that sufficient orientation cannot be attained in case the liquid-crystalline polymers used are ones having short spacers in their molecules such as methylene chain or ether chain. Further, since the liquid-crystalline polymers have no ferroelectricity, the liquid crystal optical elements are not enough satisfactory in response property and contrast.

SUMMARY OF THE INVENTION

An object of the present invention is to provide a liquid crystal optical element having large area, excellent property of responding to electric field, and high contrast, enabling display of motion pictures.

Another object of the present invention is to provide a liquid crystal optical element wherein the thickness of the liquid-crystalline polymer layer can be adjusted in a wide range such as 5 μm or less and, as well, the property of responding to electric field and contrast are further improved.

More other object of the present invention is to provide a method of producing liquid crystal optical elements which have extremely excellent practical advantage that the production thereof can be carried out under mild conditions with simple processes permitting, for example, to conduct formation of film and orientation simultaneously.

We found as the result of diligent studies for solving the problems mentioned above, that a liquid crystal optical element comprising a specific oriented liquid-crystalline polymer layer supported between two electrically conducting layers of which at least one is transparent is extremely improved in its electric field response property and contrast and, as well, can be advantageously used for large display screens or curved display screens, and we eventually completed the present invention.

That is, according to the present invention, there is provided a liquid crystal optical element comprising:
 (a) an oriented ferroelectric liquid-crystalline polymer layer which exhibits chiral smectic C phase, and
 (b) two electrically conducting layers which support the oriented ferroelectric liquid-crystalline polymer layer between them, where at least one of the two electrically conducting layers is transparent.

DESCRIPTION OF THE PREFERRED EMBODIMENTS

Figure 1:
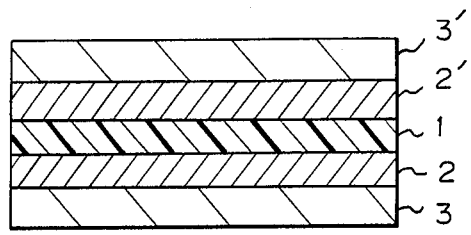
FIG. 1 is a sectional view of an embodiment of the liquid crystal optical element according to the present invention.

Hereinafter, the liquid crystal optical element of the present invention will be described in detail referring to the drawings.

FIG. 1 is a sectional view of an embodiment of the liquid crystal optical element according to the present invention, wherein an oriented ferroelectric liquid-crystalline polymer layer 1 is supported between two electrically conducting layers 2 and 2', and one of the two electrically conducting layers, for example the electrically conducting layer 2, has been previously fixed to the surface of a substrate 3. The other electrically conducting layer, i.e. the electrically conducting layer 2' in this case, may be either one provided directly on the surface of the oriented ferroelectric liquid-crystalline polymer layer 1 by evaporation, etc. or one previously fixed on the surface of a substrate 3'. In the former case, the lamination of the substrate 3' is not essential.

In the present invention, one of the important points is that at least one of the electrically conducting layers 2 and 2' is a transparent electrically conducting layer.

The transparent electrically conducting layer to be used in the present invention may be any one common in the art, and, for example, NESA layer coated with tin oxide, ITO layer consisting of tin oxide and indium oxide, and thin layer of evaporated metal may be suitable used. It is preferable to provide the transparent electrically conducting layer inside a transparent substrate such as glass substrate and transparent polymer film substrate.

The preferred transparent substrates are polymer films having flexibility, and, for example, polyester films, polycarbonate films, polyethersulfone films, and polyethyleneterephthalate films may be suitably used.

Some illustrative examples of the opaque electrically conducting layer which may be used in the present invention include an aluminum layer, evaporated metal layers, and sputtering layers, etc.

From the viewpoint of the use as optical display elements, at least the substrate adjacent to the transparent electrically conducting layer should be transparent.

When the liquid crystal optical element of the present invention is used as a display element, it is preferable to provide a polarization plate or a reflecting plate outside the transparent substrate.

Although FIG. 1 shows a liquid crystal optical element having one oriented ferroelectric liquid-crystalline polymer layer, the liquid crystal optical element of the present invention may also be constructed as a multilayer element consisting of more layers, at need.

Next, the ferroelectric liquid-crystalline polymers to be used as the base material of the oriented ferroelectric liquid-crystalline polymer layer 1 and the methods of forming films and orienting the films will be described in detail.

Ferroelectric liquid-crystalline polymer

The ferroelectric liquid-crystalline polymers exhibiting chiral smectic C phase which may be used in the present invention are not limited and may be of various kinds.

Some illustrative examples of the liquid-crystalline polymers which may be used in the present invention include (a) ferroelectric liquid-crystalline polymers having, in their side chains, radicals which exhibit ferroelectric liquid-crystalline properties in their side chains,
(b) ferroelectric liquid-crystalline polymers which are addition compounds of polymer molecules and low molecular weight liquid-crystalline compound molecules bonded by hydrogen bond or the like,
'(c) ferroelectric liquid crystalline polymers which are provided ferroelectricity by incorporating a low molecular weight ferroelectric liquid-crystalline compounds other than those described in (b) into a polymer, and
(d) mixtures thereof.

Some illustrative examples of the ferroelectric liquid-crystalline polymers of the above (a) type which may be suitably used in the present invention include ferroelectric liquid-crystalline polymers having mesogenic units in their side chains through spacers.

Such ferroelectric liquid-crystalline polymers of side-chain type consist of three parts, i.e. polymeric main chain, mesogenic unit, and spacer. Some examples of such ferroelectric liquid-crystalline polymers include those represented by the following general formula [1]:

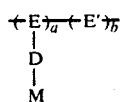

[1]

In the general formula [1], $+E+_a(E')_b$ is a polymeric chain, D is a spacer, and M is a mesogenic unit. b may be 0 (zero). When b is not 0 (zero), (E—D—M) units and (E') units may be bonded in block system, random system or alternate system.

Main chains of various kinds of polymers may be employed as the polymeric main chain. The preferred polymeric main chains include, for example, polyacrylates, polyethers, polysiloxanes, polyesters, and polymethacrylates.

Various kinds of spacers may be used as the spacer D, and the preferred spacers include, for example, those represented by the following general formula [2]:

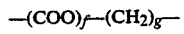

[2]

In the general formula [2], f is 0 (zero) or 1, g is n integer of 3 to 30.

Various mesogenic units may be used as the mesogen radical M, and the preferred mesogenic units include, for example, those represented by the following general formula [3]:

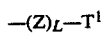

[3]

In the general formula [3], Z is O (oxygen atom), L is 0 (zero) or 1, $T^1$ is

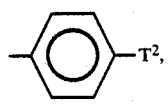

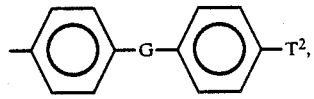

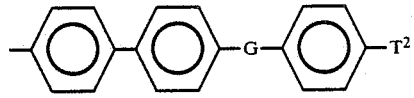

wherein,
G is, for example, —COO— or —OCO—, $T^2$ is, for example —COOT$^3$, —OCOT$^3$, —OT$^3$, —COT$^3$ or —T$^3$, T$^3$ being, for example, an alkyl radical, a halogen radical such as —Cl or —F, —CN, a chloroalkyl radical, a fluoroalkyl radical or a cyanoalkyl radical.

Describing in more detail the ferroelectric liquid-crystalline polymers which exhibit chiral smectic C phase and may be used in the present invention, the preferred are those which exhibit chiral smectic C phase usually at a temperature range of from room temperature to 150° C. and extremely excel in response speed, contrast, and moldability into film.

Some typical examples of the ferroelectric liquid-crystalline polymers of the above (a) type include polymers or copolymers, each having the repeating units represented by the respective following general formula, or blends thereof.

(I) Polyacrylate type

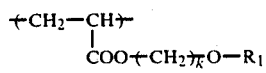

wherein
k is an integer of 1 to 30,
$R_1$ is

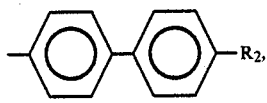

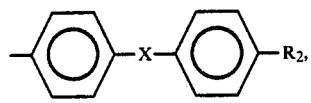

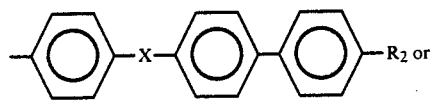

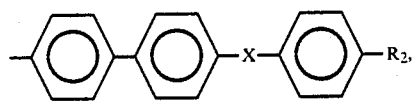

X is —COO— or —OCO—,
R₂ is —COOR₃, —OCOR₃, —OR₃ or —R₃,
wherein
R₃ is a radical represented by the following general formula:

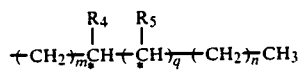

wherein
m and n are each independently an integer of 0 to 9,
q is 0 (zero) or 1,
R₄ and R₅ are each independently —CH₃, a halogen radical or —CN, with the proviso that n is not 0 (zero) when R₅ is —CH₃,
C* is an asymmetric carbon atom,
C(*) is an asymmetric carbon atom when n is not 0 (zero).

The number average molecular weight of these polymers is preferably 1,000 to 400,000. When the number average molecular weight is less than 1,000, the moldability of the polymers into film or coated film is sometimes deteriorated. On the other hand, when it exceeds 400,000, there sometimes occur undesirable results such as elongated response time. Particularly preferable range of the number average molecular weight cannot be uniformly limited since it varies depending upon the kind of R₁, value of k, optical purity of R₃, etc. It however is usually 1,000 to 200,000.

These polymers can be generally prepared by polymerizing a monomer represented by the following general formula:

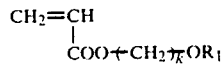

wherein
k, R₁, R₂, R₃, R₄, R₅, m, and n are as defined above,
by known method in the art.

Relating to the following two examples of the polyacrylate type liquid-crystalline polymers, the temperature $T_{sc}^*$ at which SmC* phase is exhibited and number average molecular weight are shown as follows.

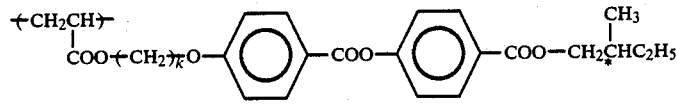

(a) k=12, Mn=5,300, $T_{sc}^*$: 5° to 12° C.
(b) k=14, Mn=6,500, $T_{sc}^*$: 13° to 31° C.

(II) Polyether type

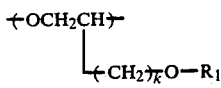

wherein
R₁, R₂, R₃, R₄, R₅, k, m and n are as defined above.

The number average molecular weight of these polymers is preferably 1,000 to 400,000. When it is less than 1,000, the moldability of the polymers into film or coated film is sometimes deteriorated. On the other hand, when it exceeds 400,000, there sometimes occurs undesirable results such as delayed response speed. Particularly preferable range of the number average molecular weight cannot be uniformly limited since it varies depending upon the kind of R₁, value of k, optical purity or R₃, etc. It is however usually 1,000 mto 200,000.

The polymers can be prepared by polymerizing a monomer represented by the following general formula:

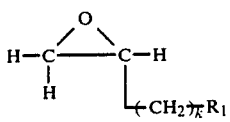

wherein
k, R₁, R₂, R₃, R₄, R₅, m, and n are as defined above, by known method in the art.

Relating to the following two examples of the polyether type liquid-crystalline polymers, the temperature $T_{sc}^*$ at which SmC* is exhibited and number average molecular weight are shown as follows.

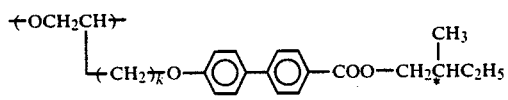

(a) k=8, Mn=2,800, $T_{sc}^*$: 24° to 50° C.
(b) k=10, Mn=2,400, $T_{sc}^*$: 19° to 50° C.

(III) Polysiloxane type

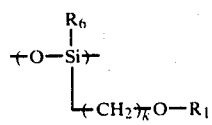

wherein
R₆ is a lower alkyl radical, and
R₁, R₂, R₃, R₄, R₅, m, and n are as defined above.

The number average molecular weight of these polymers is preferably 1,000 to 400,000. When it is less than 1,000, the moldabilty of the polymers into film or coated film is sometimes deteriorated. On the other hand, when it exceeds 400,000, there sometimes occur undesirable results such as delayed electric field response speed. Particularly preferable range of the number average molecular weight cannot be uniformly limited since it varies depending upon the kind of $R_1$, values of k, m, and n, optical purity of $R_3$, etc. It is however usually 1,000 to 200,000.

The polymers can be prepared by reacting an alkylhydropolysiloxane having the repeating units represented by the following general formula:

$$\left(O-\underset{\underset{H}{|}}{\overset{\overset{R_6}{|}}{Si}}\right)$$

wherein
$R_6$ is as defined above,
with a liquid crystal unit compound represented by the following general formula:

$$H_2C=CH(CH_2)_{k-2}-O-R_1$$

wherein
$R_1$, $R_2$, $R_3$, $R_4$, $R_5$, k, m, and n are as defined above, under specific conditions.

Relating to the following two examples of the polysiloxane type liquid-crystalline polymers, the temperature $T_{sc}^*$ at which SmC* is exhibited and number average molecular weight are shown as follows.

$$\left(\underset{\underset{(CH_2)_k O}{|}}{\overset{\overset{CH_3}{|}}{Si}}-O\right) \text{—} \bigcirc\text{—}\bigcirc\text{—}COO-CH_2\overset{*}{C}HC_2H_5$$
$$\overset{\overset{CH_3}{|}}{}$$

(a) k=6, MN=16,400, $T_{sc}^*$: 70° to 90° C.
(b) k=8, Mn=15,000, $T_{sc}^*$: 39° to 92° C.

(IV) Polyester type $$\left[\begin{array}{c}\text{—}CH_2\text{—}\underset{\underset{COO(CH_2)_{\overline{k}}(A)_{\overline{t}}R_1}{|}}{\overset{\overset{R_7}{|}}{C}}\text{—}CH_2O(CH_2)_{\overline{s}}\overset{\overset{O}{||}}{C}O\text{—}\end{array}\right]$$

wherein
$R_7$ is —H, —$CH_3$ or —$C_2H_5$,
s is an integer of 1 to 20,
A is O (oxygen) or —COO—,
t is 0 (zero) or 1, and
$R_1$, $R_2$, $R_3$, $R_4$, $R_5$, k, m, and n are as defined above, or $$\left[\begin{array}{c}\overset{\overset{O}{||}}{C}\text{—}CH\text{—}\overset{\overset{O}{||}}{C}O(CH_2)_{\overline{k}}O\\ |\\ (CH_2)_{\overline{k}}(A)_{\overline{t}}R_1\end{array}\right]$$

wherein
s, A, t, $R_1$, $R_2$, $R_3$, $R_4$, $R_5$, k, m, and n are as defined above.

These polymers can be prepared by polycondensation reaction for preparing usual polyester. That is, these polymers can be prepared by polycondensing a diabasic acid having a structure corresponding to the acid unit in the above formulas or an acyl chloride therefrom with a dihydric alcohol having a structure corresponding to the alcohol unit in the above formulas.

The number average molecular weight of the polymers is preferably 1,000 to 400,000. When it is less than 1,000, the moldability of the polymers into film or coated film is sometimes deteriorated. On the other hand, when it exceeds 400,000, there sometimes occur undesirable results such as delayed electric field response speed. Particularly preferable range of the number average molecular weight cannot be uniformly limited since it varies depending upon the kind of $R_1$, values of k, m, and n, optical purity of $R_3$, etc. It is however usually 1,000 to 200,000.

(V) Copolymers comprising the repeating units of the above-mentioned polyacrylates (I), polyethers (II), polysiloxanes (III), and polyesters (IV)

Some illustrative examples of the copolymers comprising the above-mentioned repeating units of (I) to (IV) include the followings.

(1) Copolymers comprising the repeating units of (I) and the following repeating units:

$$\left(CH_2\underset{\underset{COOR_9}{|}}{\overset{\overset{R_8}{|}}{C}}\right), \left(CH_2\underset{\underset{OCOR_9}{|}}{\overset{\overset{R_8}{|}}{C}}\right), \left(CH_2\underset{\underset{OR_9}{|}}{\overset{\overset{R_8}{|}}{C}}\right), \text{etc.,}$$

wherein
$R_8$ is —H, —$CH_3$, —Cl, F, Br or I, and
$R_9$ is an alkyl radical of 1 to 10 carbon atoms or an aryl radical.

The number average molecular weight of the copolymers is 1,000 to 400,000, preferably 1,000 to 200,000.

The content of the repeating units of (I) is preferably 20 to 90%.

(2) Copolymers prepared by copolymerizing the monomer precursor for the polymer (I):

$$\underset{\underset{COO-(CH_2)_k-OR_1}{|}}{CH_2=CH}$$

with the following monomers:

$$\underset{\underset{COO-R_{10}-O-C=O}{|}}{CH_2=CH} \quad \underset{\underset{}{|}}{CH_2=CH} \quad \underset{\underset{R_{10}}{\diagdown\diagup}}{CH_2=CH\quad CH_2=CH}, \text{etc.,}$$

wherein
$R_{10}$ is an alkyl radical of 1 to 20 carbon atoms or an aryl radical.

(3) Copolymers comprising the repeating units of (I) and the repeating units represented by the following general formula:

wherein
u is an integer of 1 to 30,
$R_{11}$ is

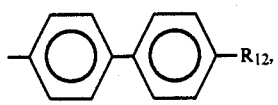

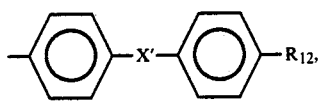

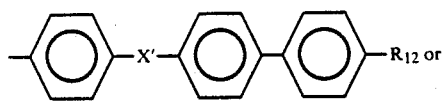

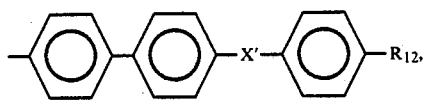

X' is —COO—, —OCO— or —CH=N—,
$R_{12}$ is —COOR$_{13}$, —OCOR$_{13}$, —OR$_{13}$ or —R$_{13}$, and
$R_{13}$ is an alkyl radical, fluoroalkyl radical or chloroalkyl radical of 1 to 10 carbon atoms.

The ferroelectric liquid-crystalline polymers to be used in the present invention are not limited to those in which one or two asymmetric carbon atoms are present in the each end portion of the side chains of the polymers. Those having 3 or more asymmetric carbon atoms in the each end portion of the side chains also may be used.

Also, mixtures of the above-mentioned ferroelectric liquid-crystalline polymer and low molecular weight liquid crystal exhibiting SmC* may be used.

Some illustrative examples of the ferroelectric liquid-crystalline polymers of the above-mentioned type (b) include blends of a polymer comprising a proton donor and/or proton acceptor and a low molecular weight ferroelectric liquid crystal compound.

Typical examples of such ferroelectric liquid-crystalline polymers are those in which a low molecular weight ferroelectric liquid crystal shown in the followings is bonded with a polyvinylacetate by hydrogen bond so that the mixture exhibiting polymeric state.

Some illustrative examples of the ferroelectric low molecular weight liquid crystal include the followings:
(1)

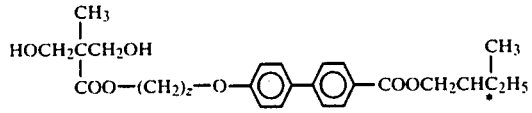

wherein z is an integer of 3 to 30.
(2) 2-methylbutyl 4-[4'-(12-dimethylolpropionyolxydodecyloxy)benzoxy]benzoate
(3) 2-methylbutyl 4-[4'-(12-(2,2-diacetoxypropionyloxy)dodecyloxy)benzoxy]benzoate
(4) 2-methylbutyl 4'—(12-dimethylolpropionyloxydodecyloxy)biphenyl-4-carboxylate
(5) 2-methylbutyl 4'-[12-2,2-diacetoxypropionyloxy)-dodecyloxy] biphenyl-4-carboxylate
(6) 2-methylbutyl 4'[4Δ-(12-dimethylolpropionyloxydodecyloxy)benzoxy]biphenyl-4-carboxylate
(7) 4'-[4''-(12-(2,2-diacetoxypropionyloxy)dodecyloxy)-benzoxy]biphenyl-4-carboxylate
(8) 4-[4''-(12-dimethylolpropionyloxy)dodecyloxybiphenyl-4'-carbonyloxy]benzoate
(9) 2-methylbutyl 4-[4''-(12-(2,2-diacetoxypropionyloxy)dodecyloxy)biphenyl-4'-carbonyloxy]benzoate Some illustrative examples of the ferroelectric liquid-crystalline polymers of the type (c) include blends of a ferroelectric low molecular weight liquid crystal and a thermoplastic amorphous polymer.

Such ferroelectric liquid-crystalline polymers are liquid crystal compositions consisting of 10 to 80% by weight of a thermoplastic amorphous polymer and 90 to 20% by weight of a ferroelectric low molecular weight liquid crystal. The addition of a specific amount of specific amorphous polymers to a low molecular weight liquid crystal, which naturally has no ability to maintain its form themselves, permits the obtained mixtures to be formed into film or the like and thus endows the mixtures with the ability to maintain their form themselves.

The thermoplastic amorphous polymers to be used in the liquid-crystalline compositions are those having no optical anisotropy and being selected from polystyrenes, polycarbonates, etc.

The low molecular weight liquid crystals to be used in the liquid-crystalline compositions are ferroelectric liquid crystal compounds which exhibit SmC* phase and are selected from, for example, the following compounds:
(1) DOBAMBC
  p-[p'-decyloxybenzylideneamino] 2-methylbutyl cinnamate
(2) 2-methylbutyl 4'-octyloxybiphenyl-4-carboxylate
(3) 2-methylbutyl 4-(4''-octyloxybiphenyl-4'-carbonyloxy)benzoate
(4) 4-(2-methylbutyloxy)phenyl 4-octyloxybenzoate
(5) 3-methyl-2-chloropentyl 4'-octyloxybiphenyl-4-carboxylate
(6) 4-octyloxybiphenyl 3-methyl-2-chloropentanoate
(7) p-]p'-hexyloxybenzylidene-p'amino] 2-chloropropyl cinnamate
(8) 4-(2-methylbutylbenzylidene)-4'-octylaniline The above-described liquid-crystalline polymers may be optionally used in a combination thereof within the range that the attainment of the object of the present invention is not impeded.

In the production of the ferroelectric liquid-crystalline polymer layer of the present invention, these liquid-crystalline polymers may be further mixed with other polymers, for example, with other liquid-crystalline polymers or with other usual resins such as olefin resins, acrylic resins, methacrylic resins, polystyrene resins, polyester resins, polycarbonate resins, styrene-butadiene copolymers, and vinylidene chloride-acrylonitrile copolymers. However, the weight ratio of the other resins to the ferroelectric liquid-crystalline polymers of the present invention is preferably 2 or less since the addition of these other resins or resins in large amount deteriorates the liquid-crystalline properties.

In order to improve the response properties or the ferroelectric liquid-crystalline polymers of the types (a) and (b), the ferroelectric low molecular liquid crystals, for example liquid crystal compound having chiral smectic C phase such as p-[p'-decyloxybenzylideneamino] 2-methylbutyl cinnamate, may be mixed also into the polymers of the types (a) and (b). The mixing ratio of the ferroelectric low molecular liquid crystals to the ferroelectric liquid-crystalline polymers of the types (a) and (b) is preferably 5 or less in weight ratio.

The method of blending the components above mentioned are not particularly limited, and these components may be blended by any usual method.

The liquid crystal optical elements of the present invention can be produced by forming an oriented layer of the ferroelectric liquid-crystalline polymers above mentioned on a transparent or opaque electrically conducting layer by a coating method, and then sandwiching the oriented layer with another electrically conducting layer so that the oriented layer is supported between two electrically conducting layers of which at least one is transparent.

The method of the coating and orientation of the ferroelectric liquid-crystalline polymer may be carried out by any method usually employed in the art such as coating and orientation with a roll coater, bar coater, gravure coater, screen printing press, etc.

Further, the orientation by coating method can also be conducted in combination with other orientation methods. For example, the ferroelectric liquid-crystalline polymer layer oriented by a coating method is supported between two transparent substrates and then is further oriented by pressing the obtained laminate.

The orientation of the ferroelectric liquid-crystalline polymers in the liquid crystal optical elements of the present invention can also be conducted by stretching the ferroelectric liquid-crystalline polymers.

The stretching of the ferroelectric liquid-crystalline polymers can be carried out by any method usually employed in stretching plastic films, such as uniaxial stretching method, biaxial stretching method, press stretching method, and inflation stretching method. Among these, uniaxial stretching method can be suitably employed.

The stretching ratio is generally 30 to 1,000%, preferably 50 to 600%. When the stretching ratio is less than 30%, the orientation degree of the ferroelectric liquid-crystalline polymer is low resulting in poor contrast ratio. On the other hand, when it exceeds 1000%, continuous film of the ferroelectric liquid-crystalline polymer cannot be obtained.

Also, the orientation by stretching method can be either conducted on a ferroelectric liquid-crystalline polymer alone, or conducted on a ferroelectric liquid-crystalline polymer supported between two plastic films. Further, the orientation can be conducted by pressing two transparent substrates supporting a ferroelectric liquid-crystalline polymer between them.

Some embodiments of the method of producing an oriented ferroelectric liquid-crystalline polymer to be used in the present invention by coating method are described in detail referring to the drawings.

Figure 2:
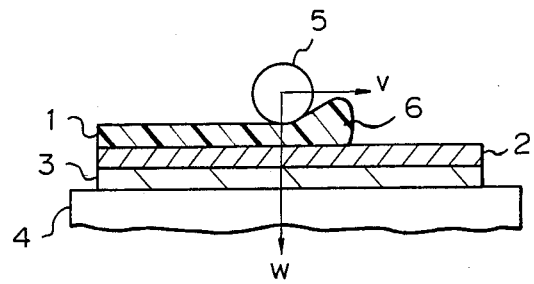
FIG. 2 is a sectional view illustrating a method of forming a film and orienting the same by a coating method in the process of producing the liquid crystal optical element according to the present invention.

FIG. 2 is a schematic and sectional view showing an example of a method of a coating of ferroelectric liquid-crystalline polymer in the process of producing the liquid crystal optical element of the present invention. In the FIG. 2, the numeral 5 represents a coating bar for forming an oriented ferroelectric liquid-crystalline polymer layer by coating and orienting a ferroelectric liquid-crystalline polymer material 6 on a substrate 3 carrying an electrically conducting layer 2 on the upper surface, and the numeral 4 represents a fixed platform equipped with a heating device.

The form of the coating bar 5 is not particularly limited, and usually a roller having a cylindrical form or a bar having a spatulate form can be suitably used. The coating bar may be heated at need.

In the coating method shown in FIG. 2, orientation and film forming are carried out by moving the coating bar 5 forward or forward and backward at a velocity to the substrate 3 and fixed platform 4 of "v".

The velocity "v" is usually 1, to 1,000 mm/sec, preferably 5 to 600 mm/sec. A load "w" is applied on the ferroelectric liquid-crystalline polymer material 6 or the oriented layer 1 by the coating bar 5. The load "w" is usually 0.5 to 100 kg/m, preferably 1 to 30 kg/m, in line pressure.

The ferroelectric liquid-crystalline polymer material 6 and the oriented ferroelectric liquid-crystalline polymer layer 1 oriented by coating are heated with the fixed platform 4. The heating temperature should be controlled under the clearing point of the ferroelectric liquid-crystalline polymer and in the range in which the ferroelectric liquid-crystalline polymer maintains a liquid crystal state such as mixed phase of smectic A phase and isotropic phase, smectic A phase, and chiral smectic C phase. In order to conduct the control of the temperature, the heating device of the fixed platform 4 is preferably equipped with a temperature controller.

When the ferroelectric liquid-crystalline polymer 6 is used, it is desirable to make it into a fluid or semi-fluid state having a viscosity convenient for forming coated film by adding a solvent or the like which is suitable for the ferroelectric liquid-crystalline polymer 6.

The solvent which may be used is not particularly limited so long as it does not impede the attainment of the objects of the present invention. However, it is preferable to use volatile solvents since the solvent used is advantageously removed by volatilization with heating in the above-mentioned film forming process.

To the ferroelectric liquid-crystalline polymer materials may be optionally added additives such as thickener, binder, and plasticizer, at need.

Thus produced ferroelectric liquid-crystalline polymer layer oriented by coating which is supported on a substrate carrying an electrically conducting layer can be made up into a liquid crystal optical element of the present invention shown in FIG. 1 by, as shown in FIG. 1, directly providing thereto an electrically conducting layer 2 by evaporation, etc., and then optionally supporting with a substrate 3', or by supporting it with a substrate 3' previously provided with an electrically conducting layer 2'.

Also, the oriented ferroelectric liquid-crystalline polymer layer 1 of the present invention can be suitably formed by a coating method shown as follows.

Figure 3:
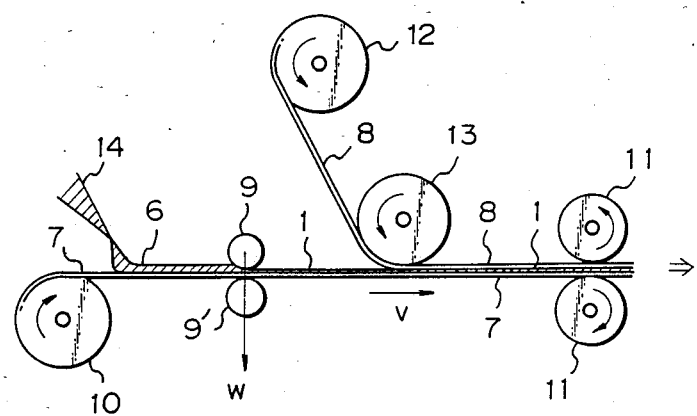
FIG. 3 is a sectional view illustrating a method of forming a film and orienting the same by another coating method in the process of producing the liquid crystal optical element according to the present invention.

FIG. 3 is a schematic and sectional view showing the coating process. In FIG. 3, a polymer film carrying a transparent electrically conducting layer 7 is continuously transferred at a velocity of "v" from a roll 10 with a roll for winding a liquid-crystalline polymer element. In the course of the transfer, a ferroelectric liquid-crystalline polymer material 6 described above is extruded from a nozzle 14 on the surface of the film 7 and was compressed with two coating bars 9 and 9' at a load of "w" to form an oriented ferroelectric liquid-crystalline polymer layer 1 oriented by coating. To the oriented layer 1 was laminated and adhered a polymer film carrying electrically conducting layer 8, which is fed from a roller 12 using a laminating roller 13, to produce a liquid crystal optical element of the present invention comprising an oriented ferroelectric liquid-crystalline polymer layer and two polymer layers (7 and 8) which support the oriented ferroelectric liquid-crystalline polymer layer and carry on their surfaces facing each other respective electrically conducting layers. In the liquid crystal optical element of the present invention, at least one of the polymer layers carrying electrically conducting layers (7 and 8) should be a transparent polymer film carrying a transparent electrically conducting layer. Thus produced liquid crystal optical element is fed to the next stage by a feeding roller.

The ranges of the transfer velocity "v" and load "w" to be employed in the embodiment is as described above.

Further, the coating bars 9 and 9' and rollers such as laminating roller 13 may also be heated at need.

The temperature as a condition of the film forming and lamination may be predetermined to the temperature range employed in the method described above in the method shown in FIG. 2.

The heating accelerates the orientation of the ferroelectric liquid-crystalline polymer and permits the removal of the solvent used by volatilization, and thus the adhesion and lamination can be effectively carried out.

The method shown as an example in FIG. 3 makes it easy to realize a continuous line of producing the liquid crystal optical elements of the present invention enabling the advantageous mass production of display screens having a large area of flexible display screens.

By means of the above-described methods, the liquid crystal optical elements of the present invention can be suitably produced.

When the ferroelectric liquid-crystalline polymer layer is oriented by the coating method, the thickness of the ferroelectric liquid-crystalline polymer layer in the product liquid crystal optical element can be controlled in a wide range by properly controlling the conditions in forming film, such as the above-mentioned transfer velocity "v" and load "w". Particularly, the coating method of the present invention makes it possible to provide liquid crystal optical elements comprising oriented ferroelectric liquid-crystalline polymer layers of 5 μm or less in thickness, which cannot be obtained easily by conventional stretching orientation.

Among the liquid crystal optical elements of the present invention, those formed and oriented by coating method have ferroelectric liquid-crystalline polymer layers oriented to a high degree and therefore are extremely improved in the electric field response property and contrast. Particularly, they can be suitably used not only as usual optical element but also as display elements for motion pictures since they have extremely excellent electric field response property and contrast due to the ferroelectric liquid-crystalline polymers employed therein which exhibit chiral smectic C phase. Also, owing to their properties as polymeric liquid crystal optical elements, they can be suitably used as optical elements for display screens of large area, bending display screens, etc. Further, they can be advantageously produced under mild conditions and by a very simple production process in which formation of film and orientation can be conducted simultaneously. Therefore, the liquid crystal optical elements of the present invention are extremely advantageous in practical use, and can be suitably used in various optoelectronic fields as optical display elements or optical memory elements.

The present invention is now described in more detail with reference to the following examples. These examples, however, are intended to illustrate the invention and are not to be construed to limit the scope of the invention.

EXAMPLE

In the following examples, the structure of each obtained polymer was confirmed by NMR, IR, and elemental analysis, and measurement of the phase transfer temperature and confirmation of the phase were conducted with a DSC and a polarization microscope respectively.

The phases exhibited by polymers are shown using the following abbreviations. [Cry: crystal, Iso: isotropic liquid, SmA: smectic A phase liquid crystal state, SmC*: chiral smectic C phase liquid crystal state, N: nematic phase liquid crystal state, N*: chiral nematic phase liquid crystal state, S₁: an unidentified smectic liquid crystal state, Glass: glass state] The numerals in the schemata showing the phase transition behavior shows the phase transition temperatures in °C. unit.

The procedures of preparing the liquid-crystalline polymers which are to be used for the liquid crystal optical elements of the present invention are shown in the following preparation examples 1 to 12. The method of orienting these liquid-crystalline polymers by coating method and the results of measurement of the response speed, contrast ratio, etc. of liquid crystal optical elements produced using these liquid-crystalline polymers are shown in the following examples 1 to 26. Other examples where liquid-crystalline polymers are oriented by stretching and employed as liquid crystal optical elements and recording elements are shown in the following examples 27 to 44.

In some examples, liquid-crystalline polymers (X to XII) having no ferroelectricity were used as liquid-crystalline polymer in addition to ferroelectric liquid-crystalline polymers (I to IX).

EXAMPLES OF PREPARING
LIQUID-CRYSTALLINE POLYMERS

Preparation Example 1

(Preparation of Liquid-crystalline polymer I)
Liquid-crystalline polymer having the repeating units represented by the following general formula:

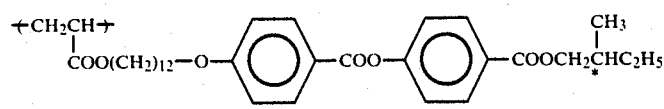

1.(1) Synthesis of 12-bromodedecyl acrylate 0.21 mol (14.8 g) of acrylic acid and 0.23 mol (41.8 g) of tetramethylammonium hydroxide (pentahydrate) were stirred for 2 hours in 300 ml of DMF (dimethylformamide) to form a homogeneous solution. To the solution was then added 0.21 mol (77.4 g) of 1,12-dibromododecane and the resulting mixture was stirred for 10 hours. Subsequently, to the resulting reaction solution was added 300 ml of water, and the mixture was then extracted with ether. The extract was purified by column chromatography to obtain 24.6 g of a bromoester compound. (Yield: 37%)

1.(2) Synthesis of 2-methylbutyl p-hydroxybenzoate 0.29 mol (40.0 g) of p-hydroxybenzoic acid and 0.35 mol (30.9 g) of (S)-(−)-2-methylbutanol were refluxed for 20 hours in 150 ml of toluene in the presence of 1 ml of concentrated sulfuric acid. The resulting reaction solution was concentrated and then purified by column chromatography to obtain 53.2 g of 2-methylbutyl p-hydroxybenzoate $[[\alpha]_D^{23} = +4.95. (CHCl_3)]$

1.(3) Synthesis of 4-carbobenzoxyoxybenzoic acid

To an aqueous solution of 55 mmol (7.6 g) of p-hydroxybenzoic acid and 65 mmol (2.6 g) of sodium hydroxide in 200 ml of water was added dropwise 65 mmol (10.6 g) of carboxybenzoxy chloride during cooling with ice. After 24 hours, the precipitate generated was washed with water, filtered, dried, and purified by column chromatography, to obtain 15.0 g of 4-carbobenzoxyoxybenzoic acid [m.p. 181.9°–183.1° C.]. (Yield: 99%)

1.(4) Synthesis of 4-carbobenzoxyoxybenzoyl chloride

A solution of 27 mmol (7.3 g) of 4-carbobenzoxyoxybenzoic acid obtained in 1.(3) and 27 mmol (5.6 g) of phosphorus pentachloride in 50 ml of ether was stirred for 24 hours at room temperature. After conclusion of the reaction, ether was removed from the reaction solution. The resulting crystals were recrystallized from hexane to obtain 4.5 g of 4-carbobenzoxyoxybenzoyl chloride [m.p.: 65.5°–67.4° C.]. (Yield 57%)

1.(5) Synthesis of 2-methylbutyl 4-(4'-carbobenzoxyoxybenzoyloxy)benzoate

A solution of 16 mmol (3.3 g) of the 2-methylbutyl p-hydroxybenzoate obtained in 1.(2) in a solvent mixture of 20 ml of THF (tetrahydrofuran) and 40 ml of pyridine was cooled, and to the solution was added dropwise a THF solution of 10 mmol (2/9 g) of the 4-carbobenzoxyoxybenzoyl chloride obtained in 1.(4). The temperature was gradually returned to room temperature, and then the mixture was stirred for 8 hours. After conclusion of the reaction, the reaction solution and purified by column chromatography to obtain 2.9 g of 2-methylbutyl 4-(4'-carbobenzoxyoxybenzoyloxy)-benzoate [m.p.: 64.4°–65.4° C.]. (Yield: 63%)

1.(6) Synthesis of 2-methylbutyl 4-(4'-hydroxybenzoyloxy)-benzoate

An ethyl acetate solution of 6 mmol (2.8 g) of 2-methylbutyl 4-(4'-carbobenzoxyoxybenzoyloxy)benzoate obtained in 1.(5) and 0.5 g of palladium carbon (5% catalyst) was reacted in an atmosphere of gaseous hydrogen for 4 hours. After the conclusion of the reaction, palladium carbon was filtered out with a membrane filter. The filtrate was concentrated and then purified by column chromatography, to obtain 1.26 g of 2-methylbutyl 4-(4'-hydroxybenzoyloxy)benzoate [m.p.: 90.8°–92.6° C.]. (Yield: 64%)

1.(7) Synthesis of 2-methylbutyl 4-(4'-(12-acryloyloxydodecyloxy)benzoyloxy]benzoate An acetone solution of 3.9 mmol (1.2 g) of the bromoester compound obtained in 1.(1), 3.3 mmol (1.1 g) of 2-methylbutyl 4-(4'-hydroxybenzoyloxy)benzoate obtained in 1.(6), and 15 mmol (2.1 g) of potassium carbonate was refluxed for 8 hours. After the conclusion of the reaction, the reaction solution was sequentially filtered, concentrated, purified by column chromatography, and recrystallized from ethanol, to obtain 0.99 g of the objective monomer $[[\alpha]_D^{23} = +2.11. (CHCl_3)]$. (Yield: 53%)

1.(8) Polymerization

Into a glass ample were placed 1.1 mmol (0.6 g) of the monomer obtained in 1.(7), 0.26 mg of AIBN (azobisisobutyronitrile), and 2 ml of dried THF. After the air in the ample was removed by frost deaeration, the content was reacted for 15 hours at 60° C. After the conclusion of the reaction, the reaction product was sequentially cooled, concentrated, diluted with chloroform (20 ml/g), and purified by high speed liquid chromatography, to obtain 0.3 g of the objective liquid-crystalline polymer (Mn=5,300). (Conversion percentage: 50%)

The phase transition behavior of the liquid-crystalline polymer was as follows:

Phase transition behavior

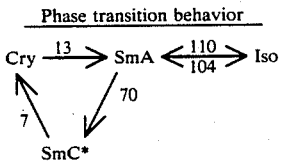

PREPARATION EXAMPLE 2

(Preparation of liquid-crystalline polymer II)

Liquid-crystalline polymer having the repeating units represented by the following general formula:

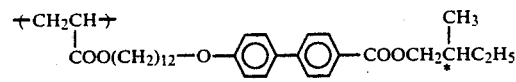

2.(1) Synthesis of 12-bromodedecyl acrylate 0.21 mol (14.8 g) of acrylic acid and 0.23 mol (41.8 g) of tetramethylammonium hydroxide (pentahydrate) were stirred in 300 ml of DMF for 2 hours to form a homogeneous solution. To the resulting solution was added 0.21 mol (77.4 g) of 1,12-dibromododecane and the mixture was further stirred for 10 hours. To the reaction solution was then added 300 ml of water and extracted with ether. The extract was purified by column chromatography to obtain 24.6 g of the objective bromoester compounds. (Yield: 37%)

2.(2) Synthesis of 2-methylbutyl 4'-hydroxybiphenyl-4-carboxylate 93 mmol (20 g) of 4'-hydroxybiphenyl-4carboxylic acid and 467 mmol (41 g) of (S)-(−)-2-methylbutanol were refluxed for 25 hours in 150 ml of benzene in the presence of 2 ml of concentrated sulfuric acid. Subsequently, the reaction solution was concentrated and then recrystallized from a toluene-hexane solvent mixture to obtain 26.0 g of a hydroxyester compound [m.p. 116.2°–117.8° C., $[\alpha]_D^{23} = +4.35$. (CHCl$_3$)]. (Yield: 98%)

2.(3) Synthesis of 2-methylbutyl 4'-(12-acryloyloxydodecyloxy)biphenyl-4-carboxylate A mixture of 15.8 mmol (5.0 g) of the bromoester compound obtained in 2.(1), 14.2 mmol (4.0 g) of the hydroxyester compound obtained in 2.(2), and 56.8 mmol (7.9 g) of potassium carbonate was refluxed for 16 hours in acetone. The resulting reaction solution was sequentially filtered, concentrated, and recrystallized from ethanol, to obtain 3.7 g of the objective monomer $[[\alpha]_D^{23} = +2.79$. (CHCl$_3$)]. (Yield: 50%)

Phase transition behavior

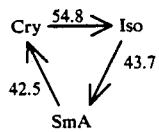

2.(4) Polymerization 1.15 mmol (600 mg) of the monomer obtained in 2.(3) was reacted for 14 hours at 60° C. in 4 ml of THF using 2.5 mg of AIBN as polymerization initiator. The resulting polymerization product was purified by column chromatography to obtain 490 mg of the objective liquid-crystalline polymer (Mn: 6,500). (conversion percentage: 82%)

Phase transition behavior

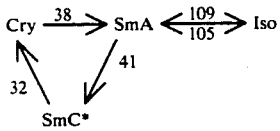

PREPARATION EXAMPLE 3

(Preparation of liquid-crystalline polymer III)

Liquid-crystalline polymer having the repeating units represented by the following general formula:

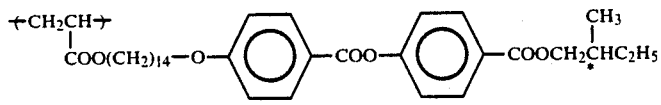

3.(1) Synthesis of 14-bromotetradecyl acrylate 0.15 mol (10.8 g) of acrylic acid and 0.15 mol (27.2 g) of tetramethylammonium hydroxide (pentahydrate) were stirred for 2 hours in 500 ml of DMF. To the reaction solution was then added 0.23 mol (81.9 g) of 1,14-dibromotetradecane, and the mixture was then further stirred for 4 hours. After the conclusion of the reaction, to the resulting reaction solution was added 300 ml of water, and the mixture was extracted with ether. The extract was sequentially dried, concentrated, purified by column chromatography, to obtain 32.3 g of the objective bromoester compound. (Yield: 62.5)

3.(2) Synthesis of 2-methylbutyl 4-(4'-(14-acryloyloxytetradecyloxy)benzoyloxy]benzoate An acetone solution of 13.9 mmol (4.8 g) of the bromoester compound obtained in 3.(1), 3.3 mmol (4.4 g) of 2-methylbutyl 4-(4'-hydroxybenzoyloxy)benzoate obtained in 1.(6), and 53 mmol (7.4 g) of potassium carbonate was refluxed for 8 hours. After the conclusion of the reaction, the reaction solution was filtered. The filtrate was sequentially concentrated, purified, and recrystallized from ethanol, to obtain 2.53 g of the objective monomer $[[\alpha]_D^{23} = +2.26$. (CHCl$_3$)]. (Yield: 32%)

3.(3) Polymerization

Into a glass ample were placed 1.0 mmol (0.60 g) of the monomer obtained in 3.(2), 2.3 mg of AIBN, and 9.5 ml of dried THF. After the air in the ample was removed by frost deaeration, the content was reacted for 16 hours at 60° C. After the conclusion of the reaction, the reaction produce was sequentially concentrated, diluted with chloroform (20 ml/g), and purified by high speed liquid chromatography, to obtain 0.35 g of the objective liquid-crystalline polymer (Mn=6,500). (Conversion percentage: 58%)

The phase transition behavior of the liquid-crystalline polymer (III) was as follows:

Phase transition behavior

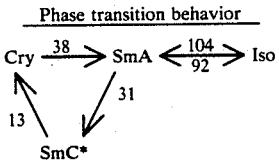

PREPARATION EXAMPLE 4

(Preparation of liquid-crystalline polymer IV)

Liquid-crystalline polymer having the repeating units represented by the following general formula:

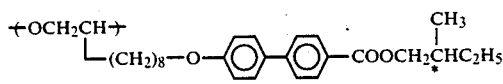

4.(1) Synthesis of 10-chloro-1-decene

To 26.0 g of 9-decene-1-ol was added 10-drops of pyridine and the mixture was placed into an eggplant flask. To the eggplant flask was added dropwise 24.0 g of thionyl chloride during cooling with ice. After dropping, the mixture was reacted for 8.5 hours at 70° C. After the conclusion of the reaction, the reaction product was diluted with dichloromethane and then washed with an aqueous potassium carbonate solution. The reaction solution was then dried over magnesium sulfate and subsequently concentrated under reduced pressure. The resulting residue was purified by column chromatography to obtain 27.7 g of 10-chloro-1-decene. (Yield: 95%)

4.(2) Synthesis of 2-methylbutyl 4'-decenyloxybiphenyl-4-carboxylate 2.5 g of 10-chloro-1-decene obtained in 4.(1) and 6.5 g of sodium iodide were dissolved in 2-butanone, and the mixture was stirred for 17 hours at 80° C. After the conclusion of the reaction, the reaction solution was diluted with dichloromethane and then washed with water. Subsequently, the resulting solution was dried over magnesium sulfate and then the solvent was distilled out under reduced pressure. To the residue were added 4.8 g of 2-methylbutyl 4'-hydroxybiphenyl-4-carboxylate obtained in preparation example 2.(2) and 2.4 g of potassium carbonate, and the mixture was reacted for 20 hours at 80° C. in 2-butanone. After the conclusion of the reaction, inorganic matters were removed by filtration, and the filtrate was concentrated under reduced pressure and then purified by column chromatography to obtain 4.6 g of the objective biphenyl derivative. (Yield: 76%)

4.(3) Synthesis of oxirane 3.0 g of the biphenyl derivative obtained in 4.(2) and 1.5 g of m-chloroperbenzoic acid were dissolved in dichloromethane. After the atmosphere of the system was replaced with argon, thus obtained solution was stirred for one day at room temperature. After the conclusion of the reaction, the reaction solution was washed with successive, an aqueous potassium carbonate solution and water. The reaction solution was then dried over magnesium sulfate, and the solvent was distilled out under reduced pressure to obtain 3.0 g of the objective monomer having the following structure. (Yield: 97%)

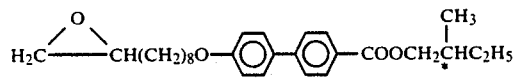

4.(4) Polymerization 0.5 g of the monomer obtained in 4.(3) was dissolved in 5 ml of dichloromethane, and the atmosphere of the system was replaced with argon. To the solution was added 0.015 g of stannic chloride, and the mixture was subjected to polymerization reaction for 6 days at room temperature. After the conclusion of the reaction, the reaction solution was poured into methanol. The precipitate formed was purified by repeated recrystallizations to obtain 0.4 g of the objective liquid-crystalline polymer IV (Mn=2,800). (Conversion percentage: 80%)

The liquid-crystalline polymer IV exhibited the following phase transition behavior:

Phase transition behavior

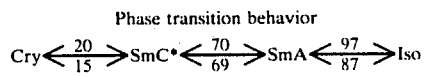

PREPARATION EXAMPLE 5

(Preparation of liquid-crystalline polymer V)

Liquid-crystalline polymer having the repeating units represented by the following general formula:

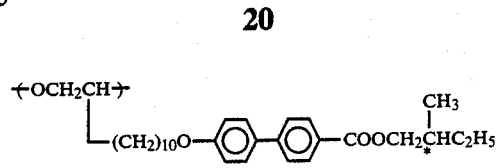

5.(1) Synthesis of 12-chloro-1-dodecene

The procedure of preparation example 4.(1) was repeated with the exception that 6.0 g of 12-dodecene-1-ol was used in place of 10decene-1-ol, and 5.2 g of 12-chloro-1-dodecene was obtained. (Yield: 79%)

5.(2) Synthesis of 2-methylbutyl 4'-dodecenyloxybiphenyl-4-carboxylate

The procedure of preparation example 4.(2) was repeated with the exception that 5.2 g of 12-chloro-1-dodecene was used in place of 10-chloro-1-decene, and 8.8 g of the objective biphenyl derivative was obtained. (Yield: 76%)

5.(3) Synthesis of oxirane

The procedure of preparation example 4.(3) was repeated using 8.8 g of the biphenyl derivative obtained in 5.(2), and 8.8 g of a monomer represented by the following formula was obtained. (Yield: 95%)

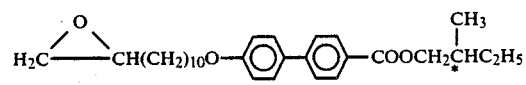

5.(4) Polymerization 2.3 g of the monomer obtained in 5.(3) was polymerized by a procedure similar to that of preparation example 4.(4), and 1.5 g of the objective liquid-crystalline polymer (Mn=3,200) was obtained. (Yield: 65%)

The liquid-crystalline polymer V exhibited the following phase transition behavior:

Phase transition behavior

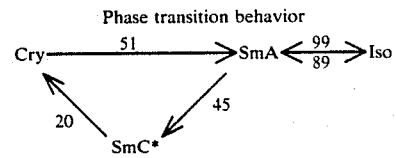

PREPARATION EXAMPLE 6

(Preparation of liquid-crystalline polymer VI)

Liquid-crystalline polymer having the repeating units represented by the following general formula:

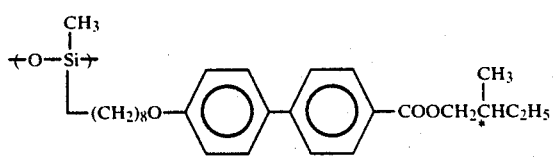

6.(1) Synthesis of 2-methylbutyl 4'-(7-octenyloxy)biphenyl-4-carboxylate 5.1 g of 8-bromo-1-octene, 8.2 g of 2-methylbutyl 4'-hydroxybiphenyl-4-carboxylate, and 4.0 g of potassium carbonate were refluxed in acetone for 20 hours. After the conclusion of the reaction, the reaction product was diluted with dichloromethane, and the inorganic matters were removed by filtration. The solvent was distilled out under reduced pressure, and the residue was purified by column chromatography to obtain 8.1 g of the objective 2-methylbutyl 4'-(7-octenyloxy)-biphenyl-4-carboxylate. (Yield: 77%)

6.(2) Polymerization 4.0 g of 2-methylbutyl 4'-(7-octenyloxy)biphenyl-4-carboxylate obtained in 6.(1) and 0.5 g of polymethylhydrosiloxane (produced by Aldrich Co., Ltd., $n_d=1.3979$, $d=1.006$, $Mn=2,900$) were dissolved in 50 ml of toluene. After addition of 5 mg of chloroplatinic acid (hexahydrate) as catalyst, the mixture was reacted for 24 hours at 80° C. in the atmosphere of argon. After conclusion of the reaction, the resulting reaction product was reprecipitated with methanol. Thus obtained polysiloxane was sequentially dried under reduced pressure, dissolved into dichloromethane, and washed with water. The dichloromethane phase was collected and dried over magnesium sulfate. Dichloromethane was then distilled out to obtain 2.1 g of the objective liquid-crystalline polymer ($Mn=15,000$).

The liquid-crystalline polymer VI exhibited the following phase transition behavior:

Phase transition behavior

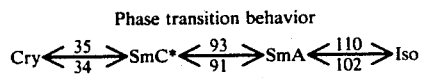

PREPARATION EXAMPLE 7

(Preparation of liquid-crystalline polymer VII)

Liquid-crystalline polymer having the repeating units represented by the following general formula:

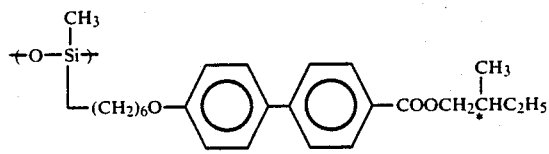

7.(1) Synthesis of 2-methylbutyl 4'-(7-hexenyloxy)biphenyl-4-carboxylate 6.4 g of the objective 2-methylbutyl 4'-(7-hexenyloxy)biphenyl-4-carboxylate was synthesized by the same procedure example 6.(1) using 4.7 g of 6-bromo-1-hexene in place of 8-bromo-1-octene, which was used in preparation example 6.(1), and using other compounds same as those used in preparation example 6.(1), i.e. 6.3 g of 2-methylbutyl 4'-hydroxybiphenyl-4-carboxylate and 3.1 g of potassium carbonate. (Yield: 79%)

7.(2) Polymerization 4.0 g of 2-methylbutyl 4'-(7-hexenyloxy)biphenyl-4-carboxylate obtained in 7.(1) and 0.6 g of polymethylhydrosiloxane used in preparation example 6.(2) were dissolved in 20 ml toluene. To the resulting solution was added 2 mg of chlorostannic acid hexahydrate as catalyst, and then reaction was carried out in the atmosphere of argon at 80° C. for 27 hours. Thereafter, the same procedure as that of preparation example 6.(2) was carried out to obtain 1.5 g of the objective liquid-crystalline polymer ($Mn=16,400$).

The liquid-crystalline polymer VII exhibited the following phase transition behavior:

Phase transition behavior

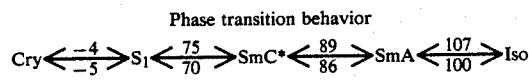

PREPARATION EXAMPLE 8

(Preparation of liquid-crystalline polymer VIII)

Liquid-crystalline polymer having the repeating units represented by the following general formula:

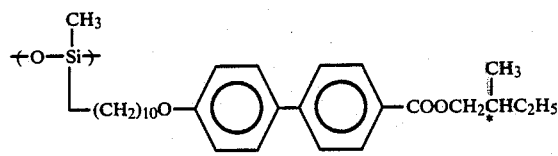

8.(1) Synthesis of 2-methylbutyl 4'-(9-decenyloxy)biphenyl)4-carboxylate 5.0 g of 10-chloro-1-decene and 12 g of sodium iodide were dissolved in 50 ml of methyl ethyl ketone and the resulting solution was then stirred for 11 hours at 80° C. After conclusion of the reaction, the reaction solution was washed with water. The organic phase was dried over magnesium sulfate and the solvent was then distilled out under reduced pressure. To the residue were added 6.5 g of 2-methylbutyl 4'-hydroxybiphenyl-4-carboxylate, 3.3 g of potassium carbonate, and 50 ml of methyl ethyl ketone as solvent, and reaction was then carried out for 28 hours at 80° C. After conclusion of the reaction, inorganic matters were removed out by washing with water. After drying was carried out over magnesium sulfate, the solvent was distilled out under reduced pressure. Thus obtained crude product was purified by recrystallization from ethanol, to obtain 7.9 g of the objective 2-methylbutyl 4'-(9-decenyloxy)-biphenyl-4-carboxylate. (Yield: 81%)

8.(2) Polymerization 5.4 g of 2-methylbutyl 4'-(9-decenyloxy)biphenyl-4-carboxylate and 0.69 g of polymethylhydrosiloxane used in preparation example 6.(2) were dissolved in 20 ml of toluene. After addition of 3 mg of chlorostannic acid hexahydrate as catalyst, reaction was carried out at 80° C. for 30 hours. Thereafter, the procedure same as that of preparation example 6.(2) was repeated, to obtain 2.0 g of the objective liquid-crystalline polymer ($Mn=16,000$).

The liquid-crystalline polymer VIII exhibited the following phase transition behavior:

Phase transition behavior

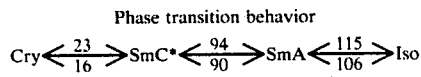

PREPARATION EXAMPLE 9

(Preparation of liquid-crystalline polymer IX)

polystyrene +

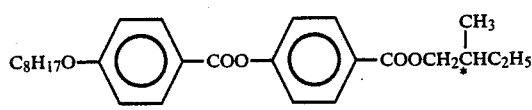

The compounds shown above were mixed to obtain a liquid-crystalline polymer IX of blend type.

The liquid-crystalline polymer IX exhibited the following phase transition behavior:

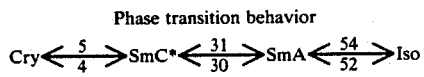

PREPARATION EXAMPLE 10

(Preparation of liquid-crystalline polymer X)

Liquid-crystalline polymer having the repeating units represented by the following general formula:

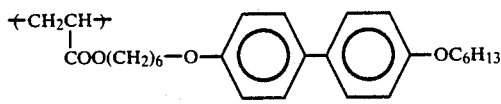

1.2 g of the objective liquid-crystalline polymer X (Mn=7,300) was synthesized using the method disclosed in M. Portugall, H. Ringdorf, R. Zentel, Makromol. Chem., 183, 2311 (1982). (Yield: 82%)

The liquid-crystalline polymer X exhibited the following phase transition behavior:

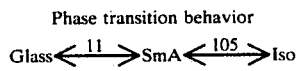

PREPARATION EXAMPLE 11

(Preparation of liquid-crystalline polymer XI)

Liquid-crystalline polymer having the repeating units represented by the following general formula:

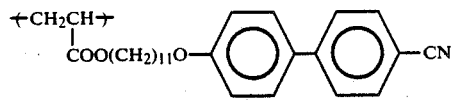

0.8 g of the objective liquid-crystalline polymer XI (Mn≈18,000) was synthesized by the method disclosed in V. P. Shibaev, S. G. Kostromin, N. A. Prate, Euro Polym. J., 18, 651 (1982). (Yield: 78%)

The liquid-crystalline polymer XI exhibited the following phase transition behavior:

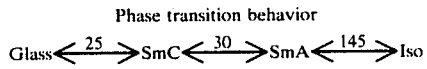

PREPARATION EXAMPLE 12

(Preparation of liquid-crystalline polymer XII)

Liquid-crystalline polymer having the repeating units represented by the following general formula:

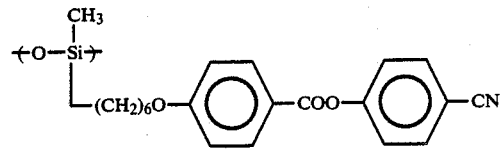

2.5 g of the objective liquid-crystalline polymer XII (Mn≈6,000) was synthesized by the method disclosed in Gemmell, P. A., Gray, G. W., Lacey, D., Mol. Cryst, Liq, Cryst, 205, 122 (1985). (Yield: 65%)

The liquid-crystalline polymer XII exhibited the following phase transition behavior:

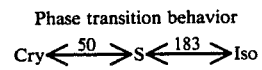

EXAMPLES 1 TO 9

An oriented liquid-crystalline polymer layer was formed on a patterned electrically conducting layer (ITO) carried by a glass substrate, by coating and orienting the liquid-crystalline polymer shown in Table 1 using an coating method shown in FIG. 2 under the conditions shown in Table 1. Subsequently, another electrically conducting layer carried by a glass substrate was laminated on the oriented liquid-crystalline polymer layer to produce a liquid crystal optical element. Measurements of contrast ratio, thickness of the oriented liquid-crystalline polymer layer, and electric field response speed were calculated on each liquid crystal optical element thus obtained. Measurement of electric field response speed was conducted by placing a cell of the liquid crystal optical element between two polarizers orthogonally crossing each other, then applying an alternating current electric field $E=4\times 10^6$ V/m and measuring the response time occupied on the change of transmission intensity (0→90%). That is, electric field response speed means the response time measured as mentioned above. Measurement of contrast ratio was conducted by placing a cell of the liquid crystal optical element between two polarizers orthogonally crossing each other and measuring the ratio between the transmission intensities measured at applied electric fields being reversed each other. That is, contrast ratio herein means the ratio between transmission intensities measured as mentioned above.

EXAMPLES 10 TO 19

Examples 10 to 19 were carried out employing an coating method shown in FIG. 3. The liquid-crystalline polymers used are shown in Table 2. The polymer films 7 and 8 are transparent polyethyleneterephthalate films and are carrying electrically conducting layers of ITO film on their surfaces facing each other. Using the liquid-crystalline polymers and the polymer films 7 and 8, liquid crystal optical elements each having a liquid-crystalline polymer layer oriented by coating method were produced by conducting coating/film-forming-/orientation treatment under the conditions shown in Table 2.

Measurements of contrast ratio at the applied voltage shown in Table 2, thickness of the oriented film, and electric field response time were conducted on each liquid crystal optical element thus produced. The results are shown in Table 2.

EXAMPLES 20 TO 26

Liquid crystal optical elements each having a liquid-crystalline polymer film oriented by coating method were produced by the same procedure as that of examples 10 to 19 with the exception that the liquid-crystalline polymer shown in Table 3 were used, the production was carried out under the conditions shown in Table 3, and all of the coating bars were of a cylinder form.

Measurements of contrast ratio, thickness of the oriented film, and electric field response time were carried out on all of the liquid crystal optical elements.

The results are shown in Table 3.

EXAMPLES 27 TO 32

Liquid crystal optical elements each having an oriented liquid-crystalline film layer which was oriented by stretching under the conditions shown in Table 4 were produced using liquid-crystalline polymers shown in Table 4.

Measurements of thickness of the oriented films and electric field response speed were carried out on these liquid crystal optical elements.

The results are shown in Table 4.

EXAMPLES 33 TO 44

The liquid crystal optical elements according to the present invention can be utilized also as memory elements by the use of semiconductor laser, in addition as optical display elements utilizing the response to electric field as shown in the above-described examples.

A layer of each liquid-crystalline polymer shown in Table 5 was provided using a roll coater on a transparent polyethyleneterephthalate substrate carrying an ITO electrically conducting layer, and then another transparent polyethyleneterephthalate substrate carrying an ITO electrically conducting layer was provided on the liquid-crystalline polymer layer, so that the liquid-crystalline polymer layer was positioned between the two ITO electrically conducting layers. Then, uniaxial stretching was conducted on the obtained laminate in the stretching ratio shown in Table 5 so that the liquid-crystalline polymer layer was oriented and became 4 $\mu$m in thickness. Write-operation was conducted on the memory elements thus produced by irradiating a beam which was irradiated from a semiconducting laser of 800 nm in wavelength and was narrowed down to a beam diameter of 10 $\mu$m with an optical system. The results of measurement of the energy density required for the write-operation are shown in Table 5.

TABLE 1

| | Coating Conditions | | | | | Measured values | | |
|---|---|---|---|---|---|---|---|---|
| Example No. | Liquid-crystalline polymer | Coating bar (Form of the bar) | V (cm/sec) | W (kg/m) | T (°C.) (Phase) | Contrast ratio (Applied voltage) | Film thickness ($\mu$m) | Response speed (sec) |
| 1 | I | Cylinder | 1 | 3 | 85(SmA) | 20 (5 V) | 5 | 0.02 (10° C.) |
| 2 | II | Spatulate | 1 | 4 | 87 (SmA) | 7 (7 V) | 4 | 0.03 (35° C.) |
| 3 | IV | Cylinder | 5 | 2 | 90(Iso + SmA) | 13 (10 V) | 7 | 0.03 (30° C.) |
| 4 | IV | Cylinder | 3 | 2 | 65 (SmA) | 18 (9V) | 6 | 0.03 (30° C.) |
| 5 | VIII | Cylinder | 1 | 3 | 94 (SmA) | 18 (5V) | 4 | 0.2 (80° C.) |
| 6 | VI | Cylinder | 1 | 3 | 94 (SmA) | 16 (5V) | 5 | 0.2 (80° C.) |
| 7 | VII | Cylinder | 1 | 3 | 90 (SmA) | 16 (5V) | 4 | 0.3 (75° C.) |
| 8 | VII | Cylinder | 4 | 10 | 81 (SmC*) | 12 (10V) | 10 | 0.3 (75° C.) |
| 9 | IX | Cylinder | 2 | 5 | 50 (SmA) | 15 (2V) | 2 | 0.005 (10° C.) |

TABLE 2

| | Coating conditions | | | | | Measured values | | |
|---|---|---|---|---|---|---|---|---|
| Example No. | Liquid-crystalline polymer | Coating bar | V (cm/sec) | W (kg/m) | T (°C.) | Contrast ratio (Applied voltage) | Film thickness ($\mu$m) | Response speed (sec) |
| 10 | I | Rotating bar | 0.5 | 5 | 85 (SmA) | 18 (5V) | 3 | 0.02 (10° C.) |
| 11 | I | Rotating bar | 0.5 | 5 | 98 (Iso + SmA) | 19 (5V) | 2 | 0.02 (10° C.) |
| 12 | II | Rotating bar | 1 | 5 | 66 (SmA) | 10 (10V) | 3 | 0.03 (35° C.) |
| 13 | IV | Rotating bar | 2 | 10 | 80 (SmA) | 17 (4V) | 4 | 0.03 (30° C.) |
| 14 | IV | Fixed bar | 2 | 10 | 80 (SmA) | 12 (5V) | 5 | 0.03 (30° C.) |
| 15 | VIII | Rotating bar | 10 | 10 | 95 (SmA) | 18 (5V) | 7 | 0.2 (80° C.) |
| 16 | VIII | Rotating bar | 4 | 7 | 71 (SmC*) | 15 (4V) | 6 | 0.2 (80° C.) |
| 17 | VI | Rotating bar | 1 | 5 | 93 (SmA) | 10 (3V) | 3 | 0.2 (80° C.) |
| 18 | VII | Rotating bar | 1 | 5 | 92 (SmA) | 13 (4V) | 4 | 0.3 (75° C.) |
| 19 | IX | Rotating bar | 1 | 6 | 86 (SmA) | 13 (4V) | 5 | 0.005 (10° C.) |

TABLE 3

| | Coating Conditions | | | | Measured values | | |
|---|---|---|---|---|---|---|---|
| Example No. | Liquid-crystalline polymer | V (cm/sec) | W (kg/m) | T (°C.) | Contrast ratio[1] | Film thickness ($\mu$m) | Response speed (sec) |
| 20 | X | 0.5 | 8 | 90 | 7 | 2 | 4.1 (40° C.) |
| 21 | X | 1 | 5 | 106 | 18 | 2 | 4.1 (40° C.) |
| 22 | XI | 4 | 8 | 122 | 44 | 3 | 3 (110° C.) |
| 23 | XI | 1 | 10 | 40 | 29 | 5 | 3 (110° C.) |
| 24 | XI | 1 | 10 | 28 | 19 | 6 | 3 (110° C.) |
| 25 | XII | 0.5 | 2 | 59 | 15 | 8 | 2.5 (55° C.) |

TABLE 3-continued

| | Coating Conditions | | | | Measured values | | |
|---|---|---|---|---|---|---|---|
| Example No. | Liquid-crystalline polymer | V (cm/sec) | W (kg/m) | T (°C.) | Contrast ratio[1] | Film thickness (μm) | Response speed (sec) |
| 26 | XII | 1 | 3 | 41 | 16 | 8 | 2.5 (55° C.) |

[1]ratio between transmission intensities each measured with rotating a cell between two polarizers orthogonally crossing each other.

TABLE 4

| | Stretching Conditions | | | | Measured values | |
|---|---|---|---|---|---|---|
| Example No. | Liquid-crystalline polymer | V (cm/sec) | Stretch ration[1] (%) | Temperature (°C.) (Phase) | Film thickness (μm) | Response speed (sec) |
| 27 | I | 1 | 200 | 90 (SmA) | 4 | 0.02 (10° C.) |
| 28 | III | 1 | 200 | 90 (SmA) | 4 | 0.03 (35° C.) |
| 29 | VII | 0.5 | 500 | 90 (SmA) | 2 | 0.3 (84° C.) |
| 30 | VI | 0.5 | 500 | 90 (SmA) | 2 | 0.35 (80° C.) |
| 31 | IV | 2 | 150 | 82 (SmA) | 3 | 0.06 (45° C.) |
| 32 | V | 2 | 150 | 84 (SmA) | 3 | 0.05 (40° C.) |

[1]Stretch ratio mean the ratio of length of film after stretching (l') to the length of film before stretching (l).
Stretch ratio = l'/l × 100 (%)

TABLE 5

| Example No. | Liquid-crystalline polymer | Stretch ratio*1 (%) | Energy density*2 |
|---|---|---|---|
| 33 | I | 100 | 20 |
| 34 | I | 200 | 16 |
| 35 | II | 100 | 19 |
| 36 | II | 200 | 17 |
| 37 | IV | 100 | 22 |
| 38 | IV | 200 | 17 |
| 39 | VI | 100 | 22 |
| 40 | VI | 200 | 13 |
| 41 | VII | 100 | 13 |
| 42 | VII | 200 | 14 |
| 43 | VIII | 100 | 14 |
| 44 | VIII | 200 | 12 |

*1 the first stretch ratio
*2 Energy density is represented by power density (mJ/cm) required to increase the contrast ratio up to 10 with 10μ · sec irradiation.

What is claimed is:

1. A liquid crystal optical element comprising:
   (a) an oriented ferroelectric liquid-crystalline polymer layer which exhibits chiral smectic C phase and which is oriented by a stretching method, and
   (b) two electrically conducting layers which support the oriented ferroelectric liquid-crystalline polymer layer between them, where at least one of the two electrically conducting layers is transparent.

2. A method of producing a liquid crystal optical element comprising:
   (a) supporting a ferroelectric liquid-crystalline polymer which exhibits chiral smectic C phase between two flexible substrates carrying on their surfaces facing each other respective electrically conducting layers, and
   (b) orienting the ferroelectric liquid-crystalline polymer by stretching the lamination product obtained in step (a).

3. A liquid crystal optical element comprising:
   (a) an oriented ferroelectric liquid-crystalline polymer layer which exhibits chiral smectic C phase, and
   (b) two electrically conducting layers which support the oriented ferroelectric liquid-crystalline polymer layer between them, where at least one of the two electrically conducting layers is transparent, which ferroelectric liquid-crystalline polymer layer is oriented by coating the ferroelectric liquid-crystalline polymer on an electrically conducting layer with a coating bar to form a coated film, wherein the coating bar is moved forward or forward and backward under the conditions that a velocity to the electrically conducting layer is 1 to 1000 mm/sec, a load on the ferroelectric liquid-crystalline polymer is 0.5 to 100 kg/m, and a temperature is in the range where the ferroelectric liquid-crystalline polymer maintains a liquid crystal state.

4. A liquid crystal optical element comprising:
   (a) an oriented ferroelectric liquid-crystalline polymer layer which exhibits chiral smectic C phase, and
   (b) two substrates which support the oriented ferroelectric liquid-crystalline polymer layer between them and carry on their surfaces facing each other respective electrically conducting layers, where at least one of the two substrates is transparent and the electrically conducting layer carried by the transparent substrate is transparent, which ferroelectric liquid-crystalline polymer layer is oriented by a coating method wherein the ferroelectric liquid-crystalline polymer is coated on an electrically conducting layer with a coating bar to form a coated film and wherein the coating bar is moved forward or forward and backward under the conditions that a velocity with respect to the electrically conducting layer is 1 to 1000 mm/sec, a load on the ferroelectric liquid-crystalline polymer is 0.5 to 100 kg/m, and a temperature of the ferroelectric liquid-crystalline polymer is in the range where the ferroelectric liquid-crystalline polymer maintains a liquid crystal state.

5. A method of producing a liquid crystal optical element comprising:
   (a) coating a ferroelectric liquid-crystalline polymer which exhibits chiral smectic C phase on an electrically conducting layer carried by a substrate to form a coated film of the ferroelectric liquid-crystalline polymer and to orient the coated film, the ferroelectric liquid-crystalline polymer being coated on an electrically conducting layer by moving a coating bar forward or forward and backward at a velocity 1 to 1000 mm/sec with respect to the electrically conducting layer, at a load of 0.5 to 100 kg/m on the ferroelectric liquid-crystalline polymer, and at a temperature in which the ferroelectric liquid-crystalline polymer maintains a liquid crystal state, and (b) laminating an electrically conducting layer carried by a substrate on the coated film of the oriented ferroelectric liquid-crystalline polymer.

* * * * *